E. A. RUSSELL AND E. A. SCHREIBER.
COUPLING FOR RAILWAY TRAIN PIPES.
APPLICATION FILED JUNE 3, 1919.
1,382,245.
Patented June 21, 1921.
2 SHEETS—SHEET 2.
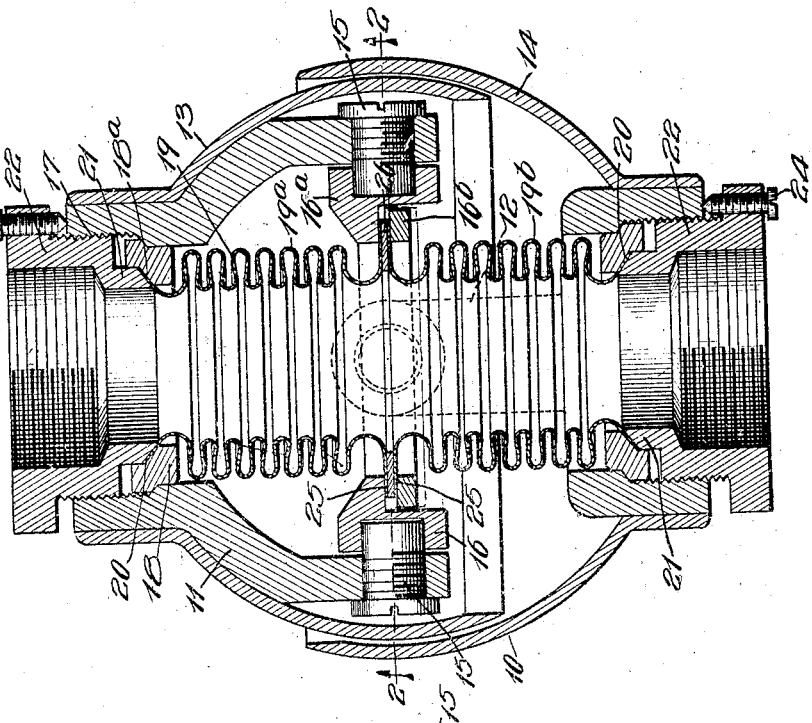
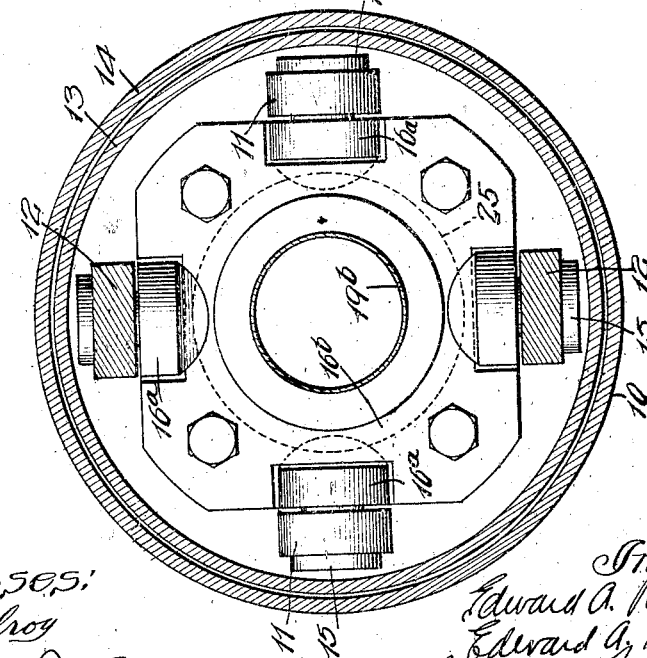

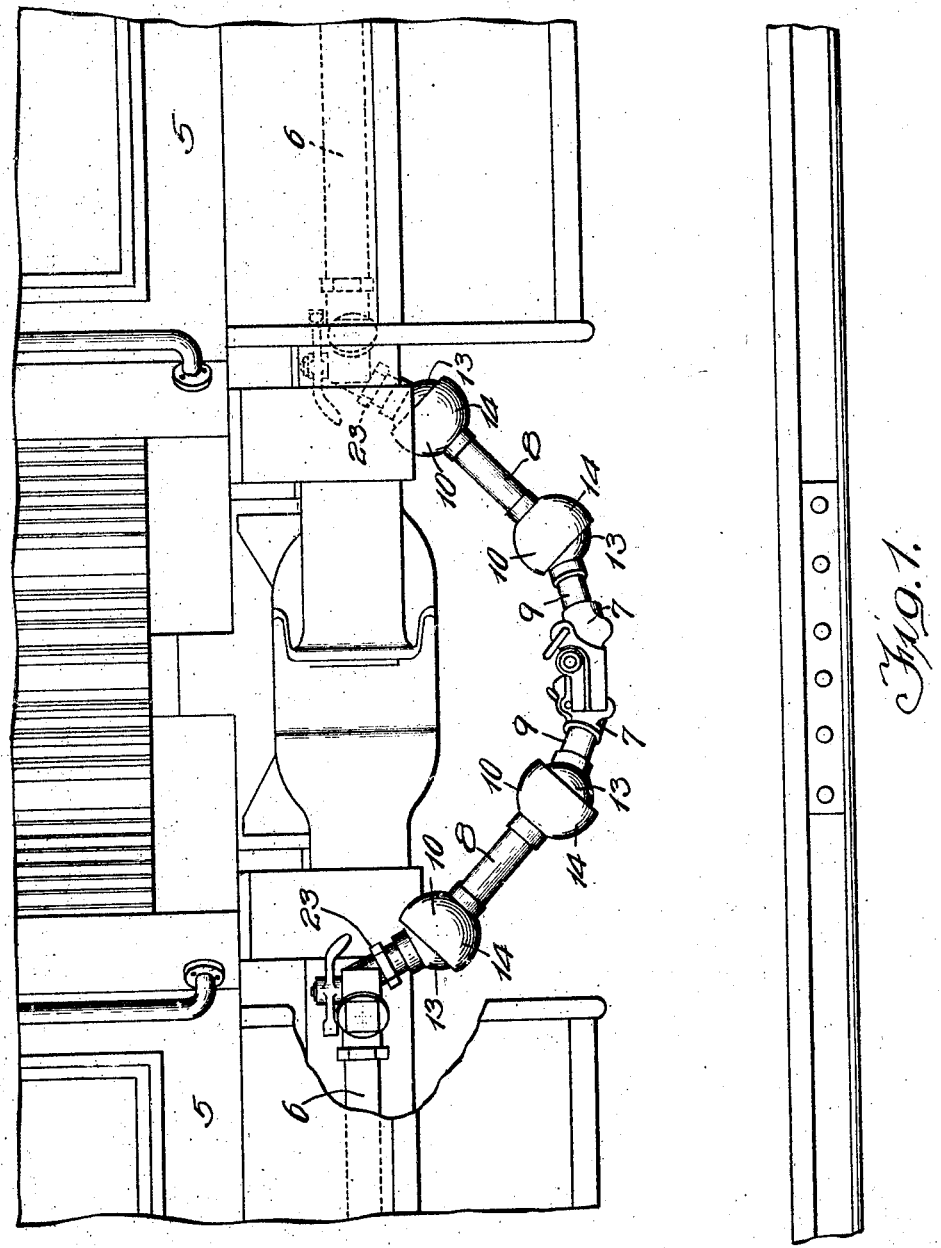

UNITED STATES PATENT OFFICE.

EDWARD A. RUSSELL AND EDWARD A. SCHREIBER, OF CHICAGO, ILLINOIS, ASSIGNORS TO VAPOR CAR HEATING COMPANY, INC., OF CHICAGO, ILLINOIS, A CORPORATION OF NEW YORK.

COUPLING FOR RAILWAY TRAIN-PIPES.

1,382,245.  Specification of Letters Patent.  Patented June 21, 1921.

Application filed June 3, 1919. Serial No. 301,439.

*To all whom it may concern:*

Be it known that we, EDWARD A. RUSSELL and EDWARD A. SCHREIBER, citizens of the United States, residing at Chicago, in the county of Cook and State of Illinois, have invented certain new and useful Improvements in Couplings for Railway Train-Pipes, of which the following is a specification.

Our invention relates to a flexible coupling for the train pipes, either steam or air, carried by the cars of a railway train. The primary object of the invention is to provide an all-metal train pipe coupling, to take the place of the usual rubber hose, which will be durable, sufficiently flexible to accommodate itself to the relative movements between the ends of the cars, on rough track, for example, or in going around curves, and to permit the ready manipulation of the coupler heads in coupling and uncoupling; and which, furthermore, will be relatively inexpensive to manufacture, will be and remain steam or air tight, and will be capable of withstanding the high pressures and temperatures, in the case of steam line couplings, to which train pipe couplings are subjected.

There are serious objections to the use of rubber hose in train pipe couplings. They are costly, last but a short time, and are very unreliable. The rubber begins to disintegrate in a short time. It is particularly easily affected by the high temperature of the steam in couplings used on steam lines. The constant vibration, and also the high pressures to which the hose is subjected, also tends to weaken and destroy them rapidly. While some efforts have been made to substitute jointed metallic structures for rubber hose in couplings used in steam and air train lines, so far as we are aware, the metal couplings have not proven satisfactory under all conditions of service. Metal couplings for railway train pipes must be capable of universal movement within certain limits. In metal couplings of the type employing a flexible, metallic, tubular diaphragm as a conduit member through the universal joint, the diaphragm has been made in one section or length. Consequently it has been subjected to bending action in all directions and it has been found very difficult to provide a diaphragm which will be durable under these conditions. If a corrugated metal tube be flexed in one direction, say by the shortening or lengthening of the distance between the cars, and is then subjected to flexure in another direction, for example, by a lateral shifting or an angular movement of one car with respect to the other, the compound bending strain to which the member is subjected is likely to be more than it can stand. Having these conditions in mind, our invention contemplates making the corrugated tubular member in a plurality of sections so related to the articulations of the universal joint that each section is flexed only in a single plane passing through the axis of such section.

The invention, while having particular utility when embodied in a railway train pipe coupling, could be employed in other situations where similar conditions are present.

The invention has for further objects the other new and improved constructions, arrangements and devices relating to pipe couplings to be hereinafter described and claimed.

The invention is illustrated in the accompanying drawings, wherein—

Figure 1 is a fragmentary side elevation of the ends of two railway cars showing the application of our invention in the construction of a train pipe coupling.

Fig. 2 is a transverse sectional view taken on the line 2—2 of Fig. 3, and

Fig. 3 is a longitudinal sectional view of the metallic joint.

Like characters of reference designate like parts in the several figures of the drawings.

Referring to Fig. 1, it will be seen that the two railway cars 5, 5 are provided with train pipes, 6, 6. The latter are connected together by means of a flexible coupling consisting of two mating couplers 7, 7 of any preferred construction, lengths of pipe 8, 8 and 9, 9, and metallic, flexible, or, more properly speaking, gimbal joints designated 10 in their entirety in this figure. The gimbal joints 10, 10 are alike and are preferably constructed so that the pivots of the upper and lower members respectively stand at right angles to each other, as shown particularly in Figs. 2 and 3.

Each joint consists of a pair of yokes 11, 12, arranged at substantially right angles to each other and provided with curved casing members, 13, 14 which fit and are movable one within the other. The yokes are pivoted by studs 15 to an annular or supporting element designated in its entirety 16. Each of the yokes is formed with an opening, the upper portion of which is threaded, as shown at 17, and the lower portion of which is formed with an inwardly inclined shoulder adapted to receive the ring 18 which is provided with an inwardly inclined or beveled seat 18$^a$. The steam passageway through the joint is provided by a flexible, corrugated, metallic, tubular diaphragm designated in its entirety 19, which is formed at opposite ends with flaring flanges 20. These flanges are bent so that they will enter the openings in the yokes and are then flattened or pressed out against the seats 18. They are clamped to the seats by means of tapered rings 21 which are formed integrally with the threaded glands 22. The joints 10, 10 are connected to their respective end valves by unions 23 which are screwed into the end valve and into the upper glands 22. The upper ends of the tubular elements 8, 8 are screwed into the lower glands 22. The lower set of joints 10, 10 are similarly connected respectively, with the tubular elements 7, 8. The glands 22 may be locked in place by means of the set screws 24, 24. The supporting member 16 is provided with a central circular opening through which the flexible, corrugated, metallic tubular diaphragm 19 may be inserted and is adapted to engage and be clamped around the middle of the diaphragm, thus holding the middle of the diaphragm against relative movement.

Preferably the diaphragm 19 is made in two sections 19$^a$ and 19$^b$. The supporting member 16 is also preferably made of the two elements 16$^a$ and 16$^b$, each part being made alike and bolted together, one part being inverted and given a quarter turn to bring the bearings for the pivots 15 substantially ninety degrees apart. The adjacent ends of the tubular diaphragm sections 19$^a$ and 19$^b$ are provided with flanges 25, 25 which project outwardly at right angles to the longitudinal axes of the diaphragms and are adapted to be clamped between the elements 16$^a$, 16$^b$ of the supporting member 16. If desired a packing ring 26 may be inserted between the flanges 25, 25 to insure a steam or air tight joint.

The train pipe coupling above described is strong, durable, steam tight, sufficiently flexible to accommodate itself to the relative movements of the cars of the train and to permit the coupler heads to be readily coupled and uncoupled in the ordinary manner, and is capable of withstanding the maximum steam pressure to which steam line couplings may be subjected without losing its flexibility. The diaphragms 19 are so connected with the rigid members of the universal joints as to provide steam-tight passageways through the joints. Being of metal, the diaphragms are capable of withstanding a very high steam pressure. They are relatively thin so as to be flexible. The function of the supporting member 16 is to provide means to which the yokes may be pivotally connected at right angles to each other and to provide means whereby the middle of the flexible diaphragm 19 may be held against movement with respect to the other parts of the diaphragm. In the preferred form the outstanding flanges 25, 25 of the diaphragms 19$^a$ and 19$^b$ are gripped between the two elements of the supporting member 16 and securely held in position. With this arrangement the section 19$^a$ of the diaphragm 19 flexes when the joint bends on the pivots of yoke 11 in which case the diaphragm section 19$^b$ does not flex. Similarly section 19$^b$ will be flexed when the bend of the joint is on the pivots of yoke 12 but in such case section 19$^a$ will not flex. Thus it will be seen that the diaphragm sections 19$^a$ and 19$^b$ are each subjected to only one bending action which results in the life of the diaphragm sections being greatly increased. The supporting member 16 is rigid and because it is pivoted at four points between the yokes 11 and 12 it is impossible to subject the diaphragm sections 19$^a$ and 19$^b$ to a twisting action. The curved casing members 13 and 14 completely surround and protect the diaphragm 19 from injury. They also inclose the yokes 11, 12 and their pivots so that all the working parts of the joint are housed and protected against injury.

The diaphragms stand in a position only slightly oblique from the vertical so that there is no danger of boiler scale, cinders or other foreign matter being intercepted and caught in their corrugations. This is an important consideration as it is impossible to keep a steam train line entirely free from particles of solid matter of this sort and if such foreign matter should lodge in the corrugations of the diaphragm the freedom of movement of the latter would be seriously impaired.

The ordinary rubber hose become very stiff when subjected to high pressures. The pressure in a steam train pipe may go as high as one hundred pounds per square inch or even higher. When the hose are made stiff by high pressure the danger of coupler heads being accidentally uncoupled, in rounding a reverse curve, for example, is very much enhanced. The flexibility of the coupling of our invention is very little affected by increase in steam pressure. The diaphragms flex practically as freely with a high pressure fluid within them as if they were empty. Moreover, the flexible structure connecting each coupler head with its end valve and consisting, in each case, of a straight, rigid pipe section united to the end valve with a universal joint and to the coupler head by a universal joint and another rigid pipe section, are of such character that they are not readily moved to a position to cause the coupler heads to uncouple even when the distance between the end valves is considerably increased. These structures are not flexible throughout as is the case with a rubber hose, which, when subjected to a flexing stress, is likely to bend at whatever happens to be the weakest point. The coupling of our invention bends only at certain definite points, being otherwise rigid. At the places where the coupling can flex it flexes much more readily than the rubber hose.

While we have described our invention as embodied in certain preferred constructions, it will be understood that modifications might be made without departure from the principles of the invention. Therefore we do not intend that the invention be limited to the particular constructions, arrangements and devices shown and described except so far as limited by the claims appended hereto.

We claim:

1. In a railway train pipe, the combination with the train pipe section carried by a car of the train, of a coupling for the same including a coupler head adapted to engage the coupling member carried by the adjacent car of the train, and a jointed structure connecting the coupler head with the train pipe section comprising a metal tubular element, a gimbal joint uniting said train pipe and tubular element, and a second gimbal joint between the other end of the tubular element and the coupler head; each joint comprising a tubular, metallic, flexible diaphragm providing a steam port therethrough, and engaging means for the middle of the diaphragm adapted to hold the two portions on opposite sides thereof from flexing except in directions at right angles to each other.

2. In a railway train pipe, the combination with the train pipe section carried by a car of the train, of a coupling for the same including a coupler head adapted to engage the coupling member carried by the adjacent car of the train, and a jointed structure connecting the coupler head with the train pipe section comprising a metal, tubular element, a gimbal joint uniting said train pipe and tubular element, and a second gimbal joint between the other end of the tubular element and the coupler head; each joint being made up of casing members, one fitting and movable within the other, flexible, metallic, tubular means providing a passageway for a fluid under pressure through said joint, and engaging means for the middle of the tubular means adapted to hold the two portions thereof on opposite sides of said engaging means from flexing except in directions at right angles to each other.

3. In a railway train pipe, the combination with the train pipe section carried by a car of the train, of a coupling for the same including a coupler head adapted to engage the coupling member carried by the adjacent car or the train, and a jointed structure connecting the coupler head with the train pipe section comprising a metal, tubular element, a gimbal joint uniting said train pipe and tubular element, and a second gimbal joint between the other end of the tubular element and the coupler head; each joint being made up of casing members, one fitting and movable within the other, a tubular, metallic, flexible diaphragm providing a steam duct through said joint, and engaging means for the middle of the diaphragm adapted to hold portions thereof on opposite sides of the engaging means from flexing except in directions at right angles to each other.

4. In a railway train pipe, the combination with the train pipe section carried by a car of the train, of a coupling for the same including a coupler head adapted to engage the coupling member carried by the adjacent car of the train, and a jointed structure connecting the coupler head with the train pipe section comprising a metal, tubular element, a gimbal joint uniting said train pipe and tubular element, and a second gimbal joint between the other end of the tubular element and the coupler head; each joint made up of a pair of yokes arranged at right angles to each other, a supporting member to which said yokes are pivoted, and flexible, tubular means providing a fluid passageway through said joint, which is secured at the middle to said supporting member.

5. In a railway train pipe, the combination with the train pipe section carried by a car of the train, of a coupling for the same including a coupler head adapted to engage the coupling member carried by the adjacent car of the train, and a jointed structure connecting the coupler head with the train pipe section comprising a metal, tubular element, a gimbal joint uniting said train pipe and tubular element, and a second gimbal joint between the other end of the tubular element and the coupler head; each joint being made up of a pair of yokes arranged at right angles to each other, an annular member to which said yokes are pivoted, and flexible, tubular means providing a fluid passageway through said joint, extending through and secured at the middle to said annular member.

6. In a railway train pipe, the combination with the train pipe section carried by a car of the train, of a coupling for the same including a coupler head adapted to engage the coupling member carried by the adjacent car of the train, and a jointed structure connecting the coupler head with the train pipe section comprising a metal, tubular element, a gimbal joint uniting said train pipe and tubular element, and a second gimbal joint between the other end of the tubular element and the coupler head; each joint being made up of a pair of yokes arranged at right angles to each other, an annular member to which said yokes are pivoted, flexible, tubular elements placed end to end and providing a fluid passageway through said joint, and means for clamping the inner ends of said tubular elements to said annular member.

7. In a railway train pipe, the combination with the train pipe section carried by a car of the train, of a coupling for the same including a coupler head adapted to engage the coupling member carried by the adjacent car of the train, and a jointed structure connecting the coupler head with the train pipe section comprising a metal, tubular element, a gimbal joint uniting said train pipe and tubular element, and a second gimbal joint between the other end of the tubular element and the coupler head; each joint being made up of a pair of yokes arranged at right angles to each other, an annular member to which said yokes are pivoted, flexible, tubular elements placed end to end and providing a fluid passageway through said joint, flanges on the adjacent ends of said tubular elements, a packing ring between said flanges, and means for clamping said flanges and packing ring against said annular member.

8. In a railway train pipe, the combination with the train pipe section carried by a car of the train, of a coupling for the same including a coupler head adapted to engage the coupling member carried by the adjacent car of the train, and a jointed structure connecting the coupler head with the train pipe section comprising a metal, tubular element, a gimbal joint uniting said train pipe and tubular element, and a second gimbal joint between the other end of the tubular element and the coupler head; each joint being made up of a pair of yokes arranged at right angles to each other formed with casing members, one fitting and movable within the other, a pair of annular members to one of which said yokes are pivoted, flexible, tubular elements placed end to end and providing a fluid passageway through said joints, flanges on the adjacent ends of said tubular elements, and means to clamp said annular members and flanges.

9. In a railway train pipe, the combination with the train pipe section carried by a car of the train, of a coupling for the same including a coupler head adapted to engage the coupling member carried by the adjacent car of the train, and a jointed structure connecting the coupler head with the train pipe section comprising a metal, tubular element, a gimbal joint uniting said train pipe and tubular element, and a second gimbal joint between the other end of the tubular element and the coupler head; each joint being made up of a pair of yokes arranged at right angles to each other formed with inclosing casing members one fitting and movable within the other, a pair of annular members to one of which said yokes are pivoted, flexible, tubular elements placed end to end and providing a fluid passageway through said joints, flanges on the adjacent ends of said tubular elements projecting outwardly at right angles to the longitudinal axis of said tubular elements and adapted to fit between said annular members, a packing ring between said flanges, and means to clamp said annular members, packing ring and flanges together.

10. In a flexible joint, the combination with yokes arranged at right angles to each other, a member to which said yokes are pivoted, and a flexible, tubular element connected at its extremities with the yokes so as to form a fluid tight passageway through the joint, and at its middle portion with the member to which the yokes are pivoted.

11. In a flexible joint, the combination with yokes arranged at right angles to each other, a member to which said yokes are pivoted, a flexible, tubular member connected at its extremities with the yokes so as to form a fluid tight passageway through the joint and at the middle to the member to which the yokes are pivoted, and protecting means surrounding said tubular member, yokes and said other member.

12. In a flexible joint, the combination with yokes arranged at right angles to each other, an annular member to which said yokes are pivoted, and a flexible, tubular member connected at its ends with the yokes so as to form a fluid tight passageway through the joint, and at its middle to the annular member, said yokes being formed with inclosing casing members, one extending and movable within the other.

13. In a flexible joint, the combination with yokes arranged at right angles to each other, a member to which said yokes are pivoted, flexible, tubular elements placed end to end and connected with said yokes so as to form a fluid passageway through the joint, flanges on the adjacent ends of said tubular elements, and means for clamping said flanges against the member to which the yokes are pivoted.

14. In a flexible joint, the combination with yokes arranged at right angles to each other, a member to which said yokes are pivoted, flexible, tubular elements placed end to end and connected with said yokes so as to form a fluid passageway through the joint, flanges on the adjacent ends of said tubular elements, a packing ring between said flanges, and means adapted to clamp said flanges and ring against the member to which the yokes are pivoted.

15. In a flexible joint, the combination with yokes arranged at right angles to each other, a supporting member comprising two similar elements to which said yokes are pivoted, flexible, tubular elements placed end to end and providing a fluid passageway through said joint, flanges on the adjacent ends of said tubular elements, and means to clamp said supporting elements together and over said flanges.

16. In a flexible joint, the combination with yokes arranged at right angles to each other, a supporting member comprising two similar elements to which said yokes are pivoted, flexible, tubular elements placed end to end and providing a fluid passageway through said joint, flanges on the adjacent ends of said tubular elements projecting outwardly at right angles to the longitudinal axes of said tubular elements, and adapted to fit between said supporting elements, a packing ring between said flanges, and means to clamp said supporting elements together.

17. A flexible joint comprising a pair of members, a flexible tubular element secured at opposite ends to said members, respectively, and means for pivotally connecting the members to substantially the middle of the tubular element on axes substantially at right angles to each other.

18. A flexible joint comprising a pair of members, an annular member to which the aforesaid members are pivoted on axes substantially at right angles to each other, and a flexible tubular element connected at its ends to the first named members and extending through and secured at substantially its middle to the annular member.

19. A flexible joint comprising a pair of members, a flexible, tubular element secured at opposite ends to said members, respectively, means for pivotally connecting the members to substantially the middle of the tubular element on axes substantially at right angles to each other, and substantially hemispherical housing members, the edge of one extending within the edge of the other, which surround said first named members and tubular element.

20. A flexible joint comprising yoke members, an annular member to which the yoke members are pivoted, a flexible, tubular element connected with the yoke members, and housing members, substantially hemispherical, surrounding the yoke members, annular member and tubular element.

21. A flexible joint comprising an annular member, a flexible, tubular element, yoke members pivoted to the annular member, and formed with threaded neck portions, rings seated in said neck portions, and glands having threaded engagement with the neck portions adapted to clamp the edges of the flexible, tubular element against said rings.

EDWARD A. RUSSELL.
EDWARD A. SCHREIBER.